United States Patent
Park et al.

(10) Patent No.: US 8,665,982 B2
(45) Date of Patent: Mar. 4, 2014

(54) CHANNEL INFORMATION TRANSMISSION METHOD AND FEEDBACK METHOD, AN APPARATUS THEREOF, A BASE STATION AND A TRANSMISSION METHOD OF THE BASE STATION

(75) Inventors: Kyoungmin Park, Seoul (KR); Jianjun Li, Seoul (KR); Sungjin Suh, Seoul (KR); Sungkwon Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/579,755

(22) PCT Filed: Feb. 17, 2011

(86) PCT No.: PCT/KR2011/001049
§ 371 (c)(1),
(2), (4) Date: Aug. 17, 2012

(87) PCT Pub. No.: WO2011/102649
PCT Pub. Date: Aug. 25, 2011

(65) Prior Publication Data
US 2012/0314787 A1      Dec. 13, 2012

(30) Foreign Application Priority Data

Feb. 19, 2010   (KR) ........................ 10-2010-0015032

(51) Int. Cl.
*H04B 7/02*        (2006.01)
(52) U.S. Cl.
USPC ........................................................ 375/267

(58) Field of Classification Search
USPC ........................................... 375/267; 370/252
See application file for complete search history.

(56) References Cited

U.S. PATENT DOCUMENTS

| | | | |
|---|---|---|---|
| 2010/0255797 A1 | 10/2010 | Yeh et al. | |
| 2011/0170427 A1* | 7/2011 | Koivisto et al. | 370/252 |
| 2012/0044830 A1* | 2/2012 | Kim et al. | 370/252 |
| 2012/0320774 A1* | 12/2012 | Dai et al. | 370/252 |

FOREIGN PATENT DOCUMENTS

| | | |
|---|---|---|
| KR | 10-2009-0023879 | 3/2009 |
| KR | 10-2009-0117583 | 11/2009 |
| WO | 2009-075456 | 6/2009 |

OTHER PUBLICATIONS

3GPP, Alcatel-Lucent, "UE PMI feedback signalling for user pairing/coordination", R1-090777, Feb. 2009, Athens Greece.*
International Search Report of PCT/KR2011/001049 dated Oct. 28, 2011.

* cited by examiner

*Primary Examiner* — Jaison Joseph
(74) *Attorney, Agent, or Firm* — H.C. Park & Associates, PLC

(57) ABSTRACT

A wireless communication system uses a multiple-input multiple-output (MIMO) antenna in the transceiver mode. The system includes the technical features of a stage in which m bits of a first set of information is transmitted for a first pre-coding matrix (where m is an integer greater than 1), and a stage in which n bits of a second set of information is transmitted for a second pre-coding matrix (where n is an integer greater than 1 but less than n).

34 Claims, 7 Drawing Sheets

CHANNEL INFORMATION TRANSMISSION METHOD AND FEEDBACK METHOD, AN APPARATUS THEREOF, A BASE STATION AND A TRANSMISSION METHOD OF THE BASE STATION

CROSS-REFERENCE TO RELATED APPLICATIONS

This application is the National Stage Entry of International Application No. PCT/KR2011/001049, filed on Feb. 17, 2011 and claims priority from and the benefit of Korean Patent Application No. 10-2010-0015032, filed on Feb. 19, 2010, both of which are hereby incorporated by reference for all purposes as if fully set forth herein.

BACKGROUND

1. Field

The present invention relates to a wireless communication system that uses a multiple-input multiple-output (MIMO) antenna.

2. Discussion of the Background

As communication systems have developed, various wireless terminals have been utilized by consumers, such as companies and individuals.

A current mobile communication system, for example, 3GPP, Long Term Evolution (LTE), LTE-Advanced (LTE-A), and the like, may be a high capacity communication system capable of transmitting and receiving various data such as image data, wireless data, and the like, beyond providing a sound-based service. Accordingly, there is a desire for a technology that transmits high capacity data, which is comparable with a wired communication network. Also, the system is required to include an appropriate error detection scheme that increases transmission efficiency of the system so as to improve performance of the system.

A communication system based on a multiple-input multiple-output (MIMO) antenna is used in both a transmitting end and a receiving end. This has a structure in which a single UE (SU) or multiple UEs may receive/transmit a signal from/to a single base station (BS) and the like.

The system using the MIMO scheme may recognize a channel status based on various reference signals and the like, and may feed back the recognized channel status to a transmitting end (another device).

That is, when a single UE is assigned with a plurality of downlink (DL) physical channels, the UE may feed back channel status information associated with each of the physical channels to a BS so as to adaptively optimize the system. To achieve the above, signals, such as a channel status index-reference signal (CSI-RS), a channel quality indicator (CQI), and a precoding matrix index (PMI), may be utilized, and the BS may perform channel scheduling based on information associated with a channel status.

SUMMARY

In accordance with an aspect of the present invention, there is provided a channel information transmitting method of a user equipment (UE), the method including: transmitting first information of m bits associated with a first precoding matrix, m being a natural number greater than 1; and transmitting second information of n bits associated with a second precoding matrix that is associated with interference, n being a natural number greater than 1 and less than m.

In accordance with another aspect of the present invention, there is provided a channel information feedback method, the method including: receiving a reference signal from a base station (BS); estimating a channel based on the received reference signal; generating, based on a result of the channel estimation of a channel estimator, channel information including first information of m bits associated with a first precoding matrix and second information of n bits associated with a second precoding matrix that is associated with interference, m being a natural number greater than 1 and n being a natural number greater than 1 and less than m; and feeding back the generated channel information.

In accordance with another aspect of the present invention, there is provided a channel information feedback apparatus, the apparatus including: a reference signal receiver to receive a reference signal from a BS; a channel estimator to estimate a channel based on the received reference signal; a channel information generator to generate, based on a result of the channel estimation of the channel estimator, channel information including first information of m bits associated with a first precoding matrix and second information of n bits associated with a second precoding matrix that is associated with interference, m being a natural number greater than 1 and n being a natural number greater than 1 and less than m; and a feedback section to feedback the generated channel information.

In accordance with another aspect of the present invention, there is provided a BS, including: a layer mapper to perform mapping of a codeword on a layer; a precoder to perform precoding of mapped symbols through use of a precoding matrix; an antenna array including two or more antennas that propagate a precoded symbol into air; and a precoder generator to generate a precoding matrix of user equipments (UEs) based on channel information including first information of m bits associated with a first precoding matrix of each UE and second information of n bits associated with a second precoding matrix that is associated with interference, m being a natural number greater than 1 and n being a natural number greater than 1 and less than m.

In accordance with another aspect of the present invention, there is provided a transmitting method, the method including: mapping a codeword on a layer; precoding mapped symbols based on a precoding matrix; transmitting a precoded symbol into air through an antenna array including two or more antennas; and generating a precoding matrix of UEs based on the channel information including first information of m bits associated with a first precoding matrix of each UE and second information of n bits associated with a second precoding matrix that is associated with interference, m being a natural number greater than 1 and n being a natural number greater than 1 and less than m.

In accordance with another aspect of the present invention, there is provided a channel information transmitting method of a UE, the method including: transmitting a first index of m bits associated with a first precoding matrix selected from among precoding matrices, m being a natural number greater than 1; and transmitting a second index of n bits associated with a second precoding matrix that is associated with interference, n being a natural number greater than 1 and less than m, and the second index in the second index transmitting operation is selected from among indices obtained by indexing indices remaining after deleting an index corresponding to at least one precoding matrix that has relatively high similarity to the first precoding matrix of the precoding matrices, or is selected from among indices obtained by indexing indices remaining after deleting an index corresponding to at least one precoding matrix that has relatively low similarity to the first precoding matrix.

In accordance with another aspect of the present invention, there is provided a channel information receiving method of a BS, the method including: receiving a first index of m bits associated with a first precoding matrix that is selected from among precoding matrices; and receiving a second index of n bits associated with a second precoding matrix that is associated with interference, and the second index in the second index receiving operation is selected from among indices obtained by indexing indices remaining after deleting an index corresponding to at least one precoding matrix that has relatively high similarity to the first precoding matrix of the precoding matrices, or is selected from among indices obtained by indexing indices remaining after deleting an index corresponding to at least one precoding matrix that has relatively low similarity to the first precoding matrix.

DETAILED DESCRIPTION OF THE ILLUSTRATED EMBODIMENT

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 1:
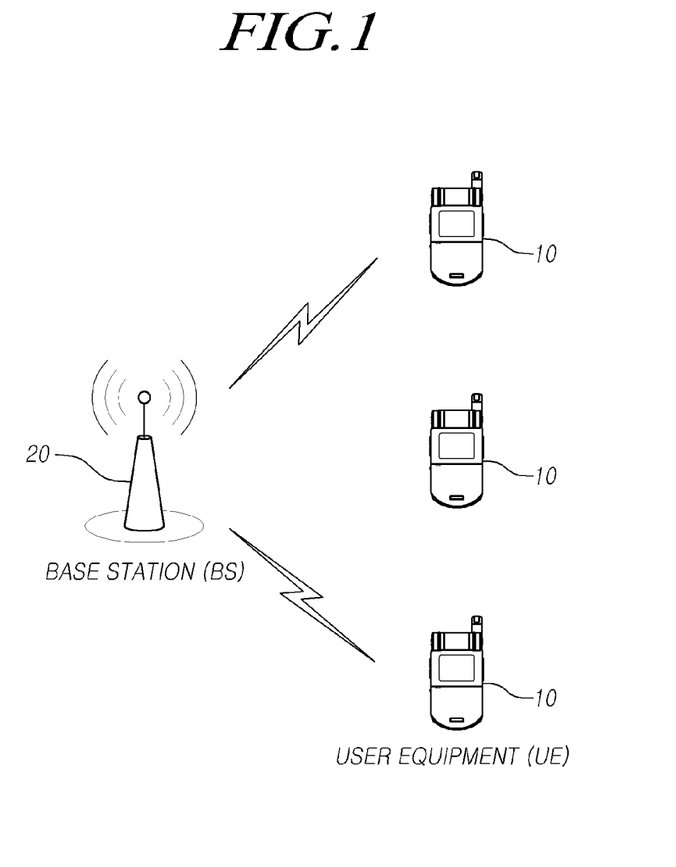
FIG. 1 is a diagram illustrating a wireless communication system according to an embodiment of the present invention.

FIG. 1 illustrates a wireless communication system according to an embodiment of the present invention.

The wireless communication system may be widely installed so as to provide various communication services, such as a voice service, packet data, and the like.

Referring to FIG. 1, the wireless communication system may include a user equipment (UE) 10 and a base station (BS) 20.

In the specifications, the UE 10 may be an inclusive concept indicating a user terminal utilized in wireless communication, including a UE in WCDMA, Long Term Evolution (LTE), HSPA, and the like, and a mobile station (MS), a user terminal (UT), a subscriber station (SS), a wireless device and the like in GSM.

The BS 20 or a cell may refer to a fixed station where communication with the UE 10 is performed, and may also be referred to as a Node-B, an evolved Node-B (eNB), a base transceiver system (BTS), an access point, a relay node, and the like.

In the specifications, the UE 10 and the BS 20 are used as two inclusive transceiving subjects to embody the technology and technical concepts described in the specifications, and may not be limited to a predetermined term or word.

An embodiment of the present invention may be applicable to an asynchronous wireless communication scheme that is advanced through GSM, WCDMA, and HSPA, to be LTE and LTE-advanced, and may be applicable to a synchronous wireless communication scheme that is advanced through CDMA and CDMA-2000, to be UMB. Embodiments of the present invention may not be limited to a specific wireless communication scheme, and may be applicable to all technical fields to which a technical idea of the present invention is applicable.

The wireless communication system may support an uplink (UL) and/or a downlink (DL) HARQ, and a channel quality indicator (CQI) may be used for link adaptation. Also, a multiple access scheme for a DL and a multiple access scheme for a UL may be different from each other. For example, a DL may use an orthogonal frequency division multiple access (OFDMA) and a UL may use a single carrier-frequency division multiple access (SC-FDMA).

To support a high speed information transmission to many users, the wireless communication system may need a scheme that increases a peak spectral efficiency that may be provided to a user having a good channel status, and a scheme that increases a cell average spectral efficiency and a cell edge spectral efficiency of a user in a poor channel environment.

To achieve the latter two purposes, the latest communication schemes may consider using a multiple user multiple-input multiple-output (MU-MIMO) scheme that simultaneously transfers information to many users through a multi-antenna. When two or more users have a high channel propagation gain with respect to the same band, the MU-MIMO scheme may allow the two users to share a band and may enable many users to use a band where a channel propagation gain is good in addition to having a gain by using a wide band and thus, a spectral efficiency may be generally increased.

In the case of an SU-MIMO scheme, multiple access interference (MAI) may not need to be considered, and each user may transfer a transmission scheme appropriate for a channel or a PMI associated with an MIMO transmission scheme (precoding matrix), as opposed to directly transferring information associated with the channel and thus, excellent performance may be readily provided.

Conversely, in the case of the MU-MIMO scheme, information associated with a channel may need to be transferred to the BS by taking MAI into consideration. Hereinafter, a feedback method and a precoding method that embodies the MU-MIMO scheme will be described in detail with reference to FIGS. 2 through 7.

Figure 2:
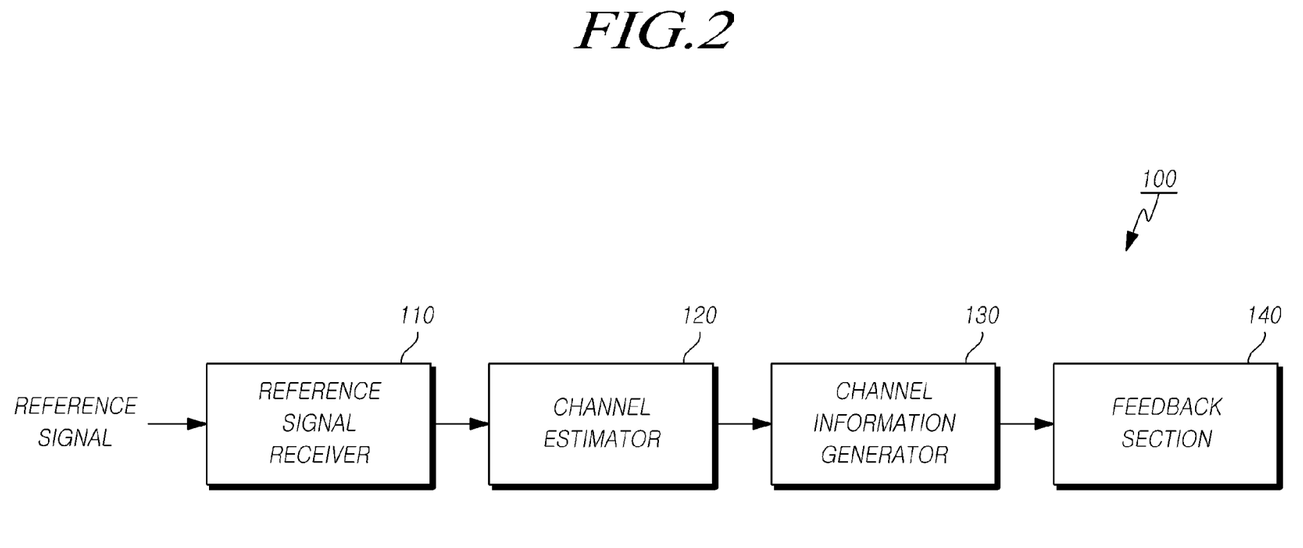
FIG. 2 is a functional block diagram illustrating a channel information feedback apparatus in a multiple-input multiple-output (MIMO) system according to an embodiment of the present invention.

FIG. 2 illustrates a channel status information feedback apparatus in an MIMO system according to an embodiment of the present invention.

An MIMO channel status information feedback apparatus 100 may be embodied as hardware or software in an existing UE that is currently connected or an additional UE that attempts connection, but this may not be limited thereto and may be embodied in a BS and the like.

The MIMO channel status information feedback apparatus 100 may include a reference signal receiver 110 to receive, from the BS, a reference signal, for example, a channel state index-reference signal (CSI-RS), a common reference signal (CRS), or a demodulation-reference signal (DM-RS), a channel estimator 120 to estimate a channel based on the received reference signal, a channel information generator 130 to generate corresponding channel information based on a channel estimation result of the channel estimator, and a feedback section 140 to feed back the generated channel information.

The reference signal receiver 110 and the channel estimator 120 may be embodied separately or integrally, and may be embodied integrally as occasion demands.

Although embodiments of the present invention describe a CSI-RS as a reference signal, the embodiments of the present invention may not be limited thereto and may use any reference signal.

The reference signal receiver 110 may receive a CSI-RS unique to a cell, and may have information associated with at which band (subcarrier) of a received signal and at which symbol the CSI-RS is received and thus, may measure a CSI-RS reception value by determining a signal of a corresponding time-frequency domain.

The CSI-RS may be a reference signal that is transmitted by the BS so that the UE may estimate a DL channel.

The channel estimator 120 may perform a function of estimating a channel based on the received CSI-RS, and the channel estimation may be performed as follows.

A reception value of the CSI-RS received by the reference signal receiver 110 may be expressed by Equation 1. In Equation 1, $\vec{r}^{RS}$ denotes a reception value of a received CSI-RS, H denotes a propagation channel, $\vec{t}^{RS}$ denotes a transmission value of a transmitted CSI-RS, and $\bar{\eta}$ denotes Gaussian noise.

$$\vec{r}^{RS} = H\vec{t}^{RS} + \bar{\eta} \qquad \text{[Equation 1]}$$

$\vec{r}^{RS}$ corresponding to the reception value of the received CSI-RS may be obtained through the above measurement, and $\vec{t}^{RS}$ corresponding to the transmission value of the CSI-RS may be a value that is known to the BS and the UE. Accordingly, H corresponding to the propagation channel may be estimated through use of a general channel estimation scheme. The propagation channel H which is a result of the channel estimation performed by the channel estimator 120 may be a channel matrix or a covariance matrix.

The channel information generator 140 may generate channel information based on the channel estimation result of the channel estimator 120. In this example, the channel information may include channel status information associated with the UE itself (hereinafter referred to as "channel status information") and multiple-access information associated with multiple-access determined by the UE or interference information associated with multiple-access (hereinafter referred to as "multiple-access information").

The channel status information may include information associated with precoding (PC) of the UE, which is appropriate for an estimated channel, for example, a precoding matrix indicator (PMI) which is an index of a precoding matrix and information associated with a channel quality, such as a channel quality indicator (CQI). The channel status information may include information indicating a channel status of a UE, such as a rank indicator (RI) in addition to the PMI and the CQI.

Also, the multiple-access information may include information associated with a precoding that is expected to cause the greatest amount of interference or the least amount of interference to be received by each UE when the BS transmits a signal based on the PMI, for example, an index associated with the precoding matrix and information associated with a corresponding channel quality.

Component elements of the channel information feedback apparatus in the MIMO system according to an embodiment of the present invention have been described. Hereinafter, a channel information generator which is one of the component elements of the channel information feedback apparatus in the MIMO system according to an embodiment of the present invention will be described.

Figure 3:
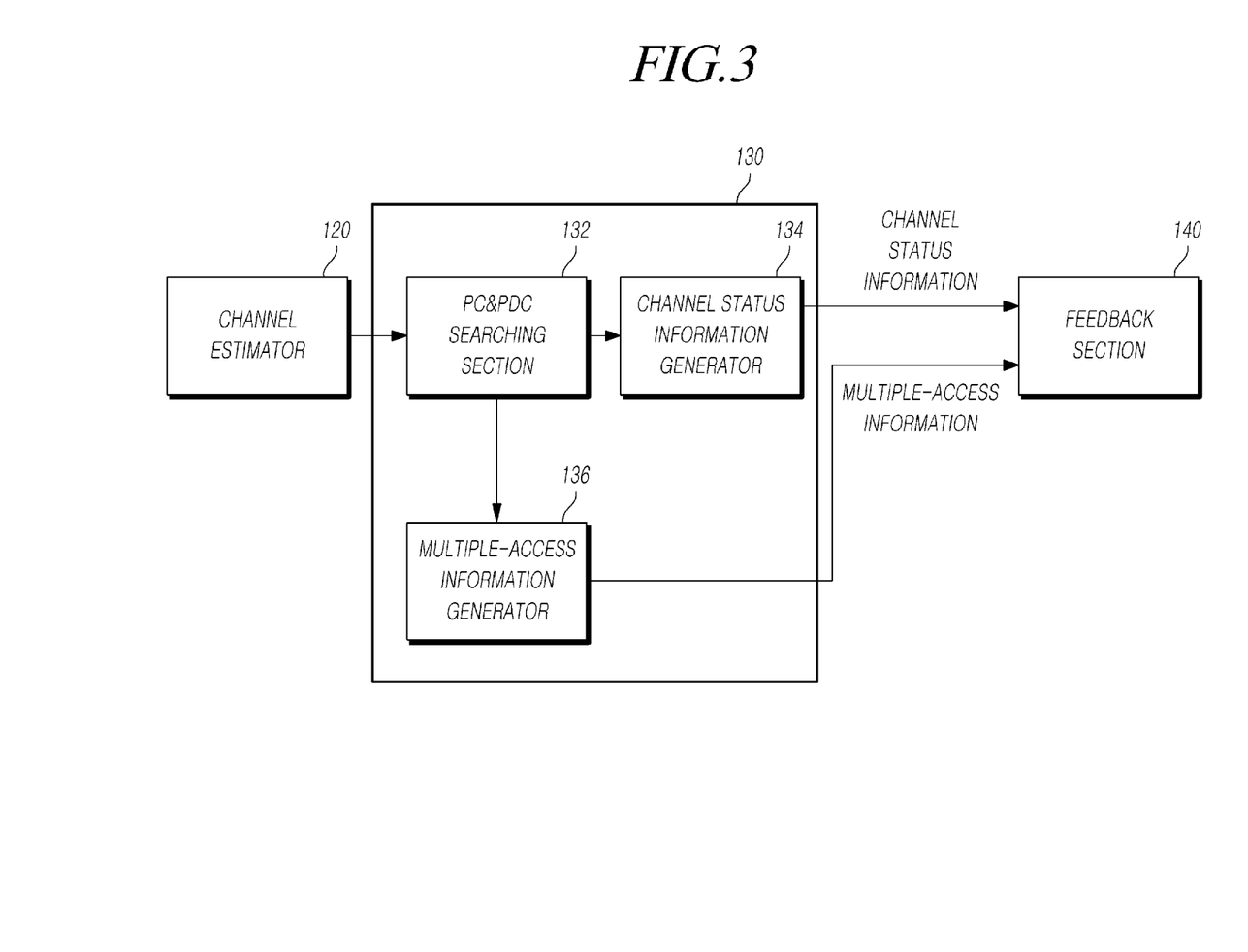
FIG. 3 is a block diagram illustrating a channel information generator of FIG. 2.

FIG. 3 illustrates the channel information generator of FIG. 2.

The channel information generator 130 may include a PC-PDC searching section 132 to search for an optimized precoder (PC) and an optimized post-decoder (PDC) based on an estimation result of the channel estimator 120, a channel status information generator 134 to generate channel status information based on information associated with the optimized PC and PDC determined by the PC-PDC searching section 132, and a multiple-access information generator 136 to generate multiple-access information.

The PC-PDC searching section 132 may search for the optimized PC and PDC based on the estimation result of the channel estimation 120, and may determine, through use of various precoding schemes, an optimized precoding scheme or an optimized PC or an optimized post-decoding scheme or an optimized PDC.

The PC-PDC searching section 132 may estimate the PDC based on a propagation channel H estimated by the channel estimator 120 and PC information estimated by the PC-PDC searching section 132.

The PC-PDC searching section 132 may determine the optimized PC and PDC by searching through a PC codebook, but this may not be limited thereto and other precoding design schemes may be available.

The channel status information generator 134 may generate, based on the PC information and the PDC estimated by the PC-PDC searching section 132, channel status information including a PMI corresponding to an index associated with a precoding matrix and information associated with a channel quality, such as a CQI.

For example, when the PC codebook is formed of indices associated with precoding matrices associated with ranks (ranks 1 and 2), as shown in Table 1. The PC-PDC searching section 132 may search through the PC codebook of Table 1 so as to determine an optimized PC, and the channel status information generator 134 may generate a PMI that is an index corresponding to the determined PC as the channel status information. In the PC codebook of Table 1, a rank corresponds to 1 or 2, and an index corresponds to 1 through 8 and thus, a total of 3 bits may be required to express the PMI.

TABLE 1

| RI PMI | 1 | 2 |
|---|---|---|
| 1 | W11 | W21 |
| 2 | W12 | W22 |
| 3 | W13 | (W23) ← Selected PMI |
| 4 | W14 | W24 |
| 5 | W15 | W25 |
| 6 | W16 | W26 |
| 7 | W17 | W27 |
| 8 | W18 | W28 |

Although the PC codebook of Table 1 describes that the rank corresponds to 1 or 2 and the index corresponds to 1 through 8, the PC codebook may not be limited thereto. For example, the PC codebook may have a rank corresponding to 1 or 2 and an index corresponding to 1 through 4, and may have a rank corresponding to 1 through 4 and an index corresponding to 1 through 16. In the case of the former example, a total of 2 bits may be required to express the PMI. In the case of the latter example, a total of 4 bits may be required to express the PMI.

For example, when W23 is determined to be a precoding matrix by searching through the codebook of Table 1 with respect to the precoding matrix estimated by the PC-PDC searching section 132, the channel status information generator 134 may generate a 3-bit binary value of "010" as a PMI associated with the precoding matrix W23.

The multiple-access information generator 136 may generate multiple-access information based on the propagation channel estimated by the channel estimator 120 and the PC information and the PDC estimated by the PC-PDC searching section 132. As described in the foregoing, the multiple-access information may include information associated with a precoding of another UE that causes the least amount of interference or the greatest amount of interference to be received by each UE when the BS transmits a signal based on a PMI, for example, an index associated with a precoding matrix of the other UE and information associated with a corresponding channel quality.

For example, the multiple-access information generator 136 may generate an index (hereinafter referred to as a "best companion indicator (BCI)") associated with information associated with a precoding that causes the least amount of interference to be received by each UE when a BS transmits a signal based on a precoding matrix indicated by the PMI. Conversely, the multiple-access information generator 136 may generate an index (hereinafter referred to as a "worst companion indicator (WCI)") associated with information associated with a precoding that causes the greatest amount of interference to be received by each UE when the BS transmits a signal based on the PMI.

The BCI may be a factor associated with a codeword that shows a smallest precoding gain with respect to a channel that is determined to use the PMI and a PDC corresponding to the PMI. Accordingly, the BCI may be an index that designates a precoding matrix that has the lowest similarity to a precoding matrix indicated by the PMI. For example, similarity may indicate a distance between precoding matrices or correlation or correlationship between precoding matrices. That is, a precoding matrix that has the lowest similarity may indicate a precoding matrix of which a chordal distance to the precoding matrix indicated by the PMI is long, or may indicate a precoding matrix of which correlation with the precoding matrix indicated by the PMI is the lowest.

The BCI, which is one of the multiple-access information, may be a precoding matrix that has significantly low similarity to the precoding matrix indicated by the PMI and thus, may have a high probability of being selected from among precoding matrices having low correlation with the precoding matrix indicated by the PMI or precoding matrices of which distances to the precoding matrix indicated by the PMI are long. Therefore, after the PMI is determined, a codeword that shows the smallest precoding gain with respect to the channel that is determined to use the PMI and the PDC corresponding to the PMI may be determined through iterative searching, and a factor indicating the codeword may be indicated to be the BCI through use of identical bits as the PMI. In this example, determining of the PMI and the BCI may be a scheme that selects one of the codewords in Table 1.

Conversely, codewords that have small differences from the PMI may have a low probability of being selected to be the BCI. Codewords that have the low probability of being selected to be the BCI may be deleted as shown in Table 2, and a codebook may be re-set to have a small size as shown in Table 3 and the BCI may be selected based on the re-set codebook. Accordingly, feedback overhead may be reduced during reporting of the BCI, and complexity in a receiving end may be reduced since a number of iterative searches is decreased.

TABLE 2

| RI PMI | 1 | 2 | |
|---|---|---|---|
| 1 | W11 | ~~W21~~ | Deleting 3 codewords having the minimum distance with w23 |
| 2 | W12 | ~~W22~~ | |
| 3 | W13 | W23 | |
| 4 | W14 | W24 | |
| 5 | W15 | ~~W25~~ | |
| 6 | W16 | W26 | |
| 7 | W17 | W27 | |
| 8 | W18 | W28 | |

TABLE 3

New codebook with 2bits indication

| RI PMI | 1 | 2 |
|---|---|---|
| 1 | W14 | W24 |
| 2 | W15 | W25 |
| 3 | W16 | W26 |
| 4 | W18 | W28 |

Hereinafter, a process will be described in which the multiple-access information generator 136 selects a precoding matrix that has the lowest similarity to the precoding matrix indicated by the PMI, and generates a BCI corresponding to an index that designates a precoding matrix that has the lowest similarity to the precoding matrix indicated by the PMI in Table 3.

In the MU-MIMO scheme that allows simultaneous access of n UEs, a transmission signal of each UE is $S_r = P_0 s_0 + \ldots + P_n s_n$ ($P_x$ denotes a precoding matrix of each UE x (x=0 through n, identical for the rest) and $S_x$ denotes a signal component of each UE x (x=0 through n)).

A received signal of a predetermined UE i is $r_i = H_i S_r = H_i P_0 s_0 + \ldots + H_i P_n s_n$ ($H_x$ denotes a propagation channel associated with each UE x).

A signal of a predetermined UE i after post-decoding is $y_i = D_i r_i = D_i H_i P_0 s_0 + \ldots + D_i H_i P_n s_n$ ($D_x$ denotes a post-decoding matrix associated with each UE x).

In this example, diag($D_i H_i P_0 s_0$) denotes reception of information associated with a predetermined UE i, $D_i H_i P_0 s_0$–diag ($D_i H_i P_0 s_0$) denotes inter-layer interference, and $D_i H_i P_m s_m$, $m \neq i$ denotes inter-UE interference.

Accordingly, the BCI is an index of a precoding matrix $P_m$ that minimizes $D_i H_i P_m s_m$, $m \neq i$. When $D_i H_i \perp P_m$ ($\perp$ denotes an orthogonal state), interference may not occur. Conversely, the PMI is an index associated with precoding matrix $P_0$ that maximizes a diagonal component of $D_i H_i P_0$. Therefore, $P_m$ that has low similarity to $P_0$ may be generally selected to be a BCI.

That is, $P_m$ that has high similarity to $P_0$ may have low probability of being selected to be the BCI. Accordingly, a number of bits required for reporting the BCI may be reduced by deleting codewords having relatively higher similarity to a selected PMI after selecting the PMI so as to decrease a size of a codebook, and selecting the BCI from the codebook In the case of feeding back a WCI instead of the BCI, overhead caused by reporting of the WCI may be reduced by removing codewords having the highest similarity to the selected PMI, for example, codewords having long distances, as opposed to the BCI.

For example, in $y_i = D_i r_i = D_i H_i P_0 s_0 + \ldots + D_i H_i P_n s_n$, an index associated with $P_m$ that maximizes $D_i H_i P_m s_m$, $m \neq i$ is the WCI and thus, a precoding matrix indicated by the WCI may have high similarity to the precoding matrix indicated by the PMI. When similarity between matrices is determined based on a chordal distance, this indicates that the chordal distance is short. Therefore, unlike the BCI, a size of a codebook for the WCI may be decreased by deleting codewords of which chordal distances to the precoding matrix indicated by the PMI are relatively short as shown in Table 4.

TABLE 4

| PMI \ RI | 1 | 2 | |
|---|---|---|---|
| 1 | W11 | W21 | Deleting 3 codewords having the maximum distance with w23 |
| 2 | W12 | W22 | |
| 3 | W13 | W23 | |
| 4 | W14 | W24 | |
| 5 | W15 | ~~W25~~ | |
| 6 | W16 | W26 | |
| 7 | W17 | ~~W27~~ | |
| 8 | W18 | ~~W28~~ | |

When the codebook of table 1 is sorted for differential PMI feedback, or when an explicit codebook that feeds back channel status information is used, the codebook may be formed by indexing codewords based on similarity of the codewords. When the codebook is used by indexing the codewords based on the similarity of the codewords, the size of the codebook for the BCI may be reduced by deleting codewords adjacent to a selected PMI as shown in Table 5 after selecting the PMI, or the size of the codebook for the WCI may be reduced by deleting codewords that are not adjacent to the selected PMI as shown in Table 6. Therefore, the codebook for the BCI or the codebook for the WCI may be readily set.

TABLE 5

| PMI \ RI | 1 | 2 | |
|---|---|---|---|
| 1 | W11 | ~~W21~~ | Deleting adjuscent codewords |
| 2 | W12 | ~~W22~~ | |
| 3 | W13 | W23 | |
| 4 | W14 | ~~W24~~ | |
| 5 | W15 | W25 | |
| 6 | W16 | W26 | |
| 7 | W17 | W27 | |
| 8 | W18 | W28 | |

TABLE 6

| PMI \ RI | 1 | 2 | |
|---|---|---|---|
| 1 | W11 | W21 | |
| 2 | W12 | W22 | Selected PMI |
| 3 | W13 | (W23) | |
| 4 | W14 | W24 | |
| 5 | W15 | W25 | |
| 6 | W16 | ~~W26~~ | |
| 7 | W17 | ~~W27~~ | |
| 8 | W18 | ~~W28~~ | |

Referring again to FIG. 2, the feedback section 140 may feed back, to the BS, channel information including the channel status information and the multiple-access information. In the case of the MIMO scheme that allows simultaneous access of n UEs, channel information fed back by the feedback section 140 of each UE may include channel status information including a PMI of each UE and multiple-access information including (n−1) BCIs.

Transmission periods of the channel status information and the multiple-access information fed back by the feedback section 140 may be the same as or different from each other.

The channel status information feedback apparatus in the MIMO system according to an embodiment of the present invention has been described. Hereinafter, a channel status information feedback method in the MIMO system according to an embodiment of the present invention will be described.

Figure 4:
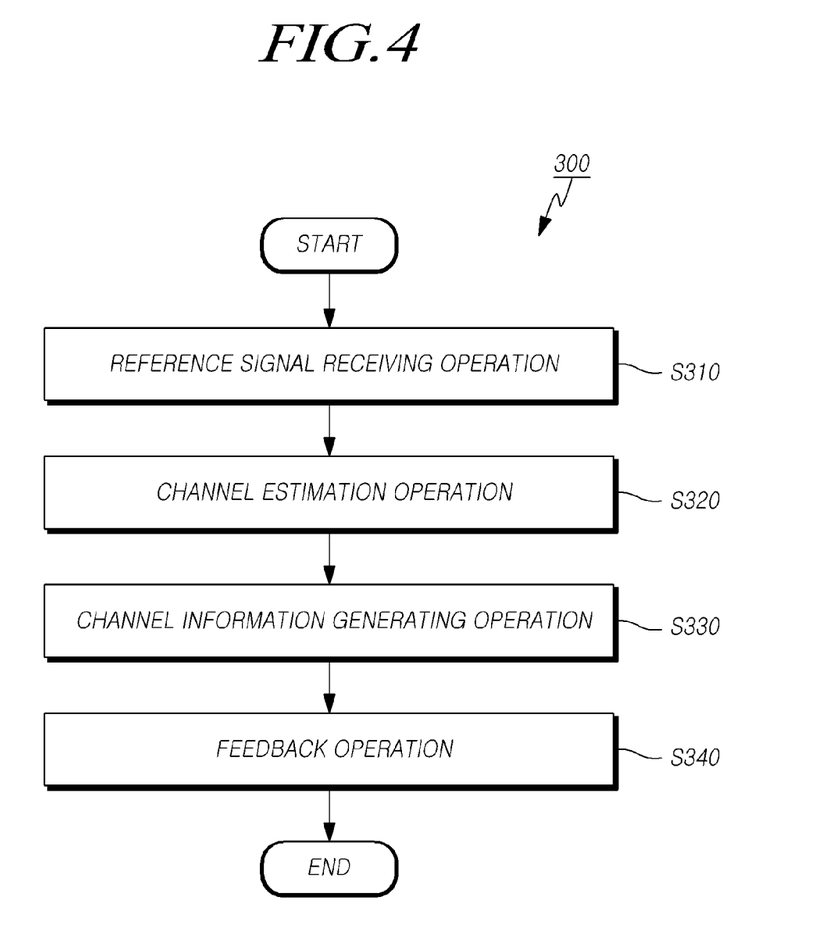
FIG. 4 is a flowchart illustrating a channel information feedback method in an MIMO system according to another embodiment of the present invention.

FIG. 4 illustrates a channel status information feedback method in an MIMO system according to another embodiment of the present invention.

A MU-MIMO channel status information feedback method 300 may include a reference signal receiving operation (step S310) that receives, from a BS, a reference signal, for example, a CSI-RS, a CRS, or a DM-RS, a channel estimation operation (step S320) that estimates a channel based on the received reference signal, a channel information generating operation (step S330) that generates channel information corresponding to a channel estimation result of the channel estimation operation (step S320), and a feedback operation (step S340) that feeds back the channel information.

The reference signal receiving operation (step S310) and the channel estimation operation (step S320) may be embodied separately or integrally, or may be embodied integrally as occasion demands.

The reference signal receiving operation (step S310) may receive a CSI-RS unique to a cell, and may have information associated with at which band (subcarrier) of a received signal and at which symbol the CSI-RS is received and thus, may measure a CSI-RS reception value by determining a signal of a corresponding time-frequency domain.

The channel estimation operation (step S320) may perform a function of estimating a channel based on the received CSI-RS, and the channel estimation may be performed as follows. A reception value of the CSI-RS received in the reference signal receiving operation (step S310) may be expressed by Equation 1. $\bar{r}^{RS}$ corresponding to the reception value of the received CSI-RS may be obtained through the above measurement, and $\bar{t}^{RS}$ corresponding to the transmission value of the CSI-RS may be a value that is known to the BS and the UE. Accordingly, H corresponding to a propagation channel may be estimated through use of a general channel estimation scheme.

Subsequently, the channel information generating operation (step S340) may generate the channel information based on the channel estimation result of the channel estimation operation (step S320). As described in the foregoing, the channel information may include channel status information associated with a UE itself and multiple-access associated with other UEs associated with multiple-access determined by the UE or interference information associated with the multiple-access.

A few operations performed by the channel information feedback apparatus in the MIMO system according to an embodiment of the present invention have been described. Hereinafter, examples of a channel information generating operation, which is one of the operations included in the channel feedback method in the MIMO system according to an embodiment of the present invention, will be described.

Figure 5:
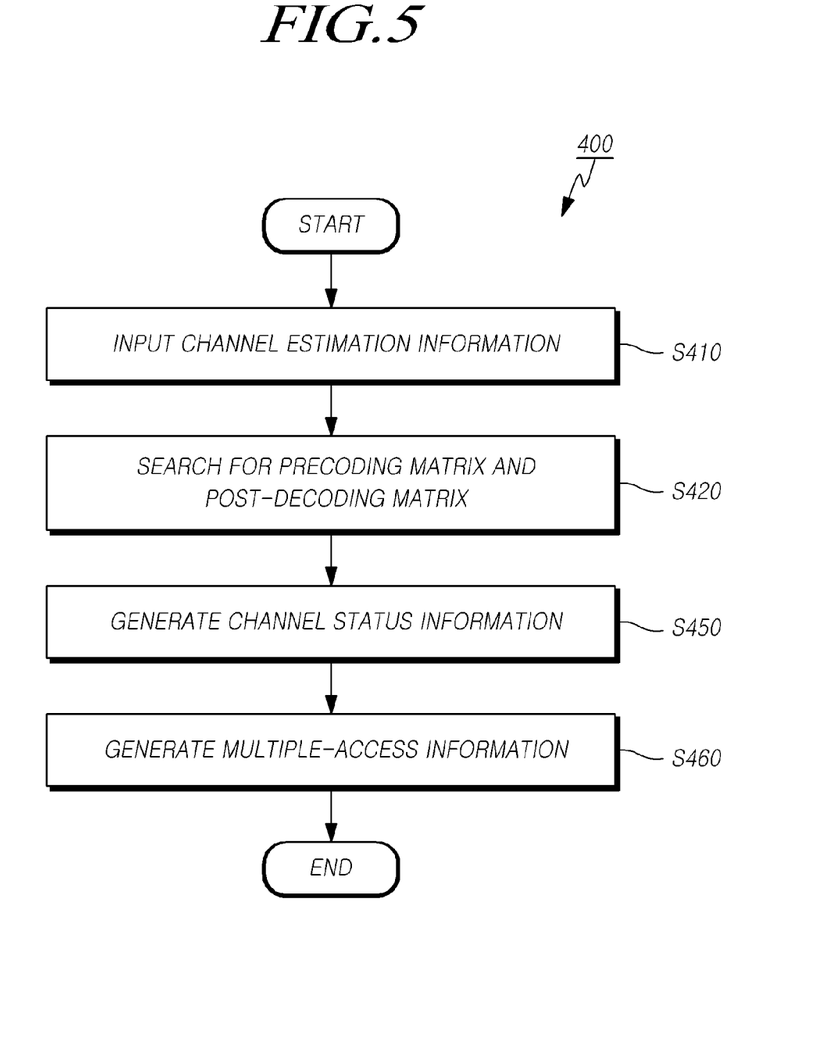
FIG. 5 is a flowchart illustrating an example of a channel status information generating method according to another embodiment of the present invention.

FIG. 5 illustrates an example of a channel status information generating method according to another embodiment of the present invention.

A channel information generating method 400 of FIG. 5 may correspond to a portion of the channel status information generating operation (step S340), and simultaneously, may configure an independent method. In other words, the channel information generating method 400 of FIG. 5 may configure a method that is independent from a pre-operation and a post-operation of the channel information generating operation (step S340), and the channel information generating method 400 may be included in embodying of another technology.

Referring to FIGS. 4 and 5, an estimated propagation channel which is a channel estimation result of the channel estimation operation (step S320) may be received (step S410).

Subsequently, searching for an optimized PC and an optimized PDC may be performed based on the input propagation channel corresponding to the estimation result of the channel estimation operation (step S320), and an optimized precoding scheme or an optimized PC and an optimized post-decoding scheme or an optimized PDC may be determined (step S420).

Also, in step S420, the PDC may be estimated based on the propagation channel H estimated in the channel estimation operation (step S320) and the PC information estimated by the PC-PDC searching section 132.

Subsequently, channel status information including a PMI corresponding to an index associated with a precoding matrix and information associated with a channel quality, such as a CQI, may be generated based on the PC information and the PDC estimated in step S420 (step S450). As described in the foregoing, when the precoding matrix estimated in step S420 is determined to be W23 by searching through the codebook of Table 1, a 3-bit binary value of "010" may be generated to be a PMI for the precoding matrix W23 (step S450).

Subsequently, multiple-access information may be generated based on the propagation channel estimated in the channel estimation operation (step S320) and the PC information and the PDC estimated in step S420 (step S460). In particular, codewords having small differences from the PMI of Table 1 may have a low probability of being selected to be the BCI. Accordingly, the codewords that have the low probability of being selected to be the BCI may be deleted as shown in Table 2, and a codebook may be re-set to have a small size as shown in Table 3 and the BCI may be selected based on the re-set codebook.

Unlike the BCI, a codebook for a WCI may be set by deleting codewords of which chordal distances to a precoding matrix indicated by the PMI are short as shown in Table 4, and the WCI may be selected based on the set codebook.

When the codebook is used by indexing codewords based on similarity of the codewords, a size of the codebook for the BCI may be decreased by deleting codewords adjacent to a selected PMI as shown in Table 5, after selecting the PMI, or a size of the codebook for the WCI may be decreased by deleting codewords that are not adjacent to the selected PMI as shown in Table 6.

Referring again to FIG. 4, the feedback operation 340 may feed back, to a BS, channel information including the channel status information and the multiple-access information. In the case of the MIMO scheme that allows simultaneous access of n UEs, channel information fed back by each UE in the feedback operation (step 340) may include the channel status information including a PMI associated with a corresponding UE and the multiple-access information including (n−1) BCIs.

In the feedback operation 340, transmission periods of the channel status information and the multiple-access information may be the same as or different from each other.

The channel status information feedback method in the MIMO system according to an embodiment of the present invention has been described. Hereinafter, a BS according to another embodiment will be described.

Figure 6:
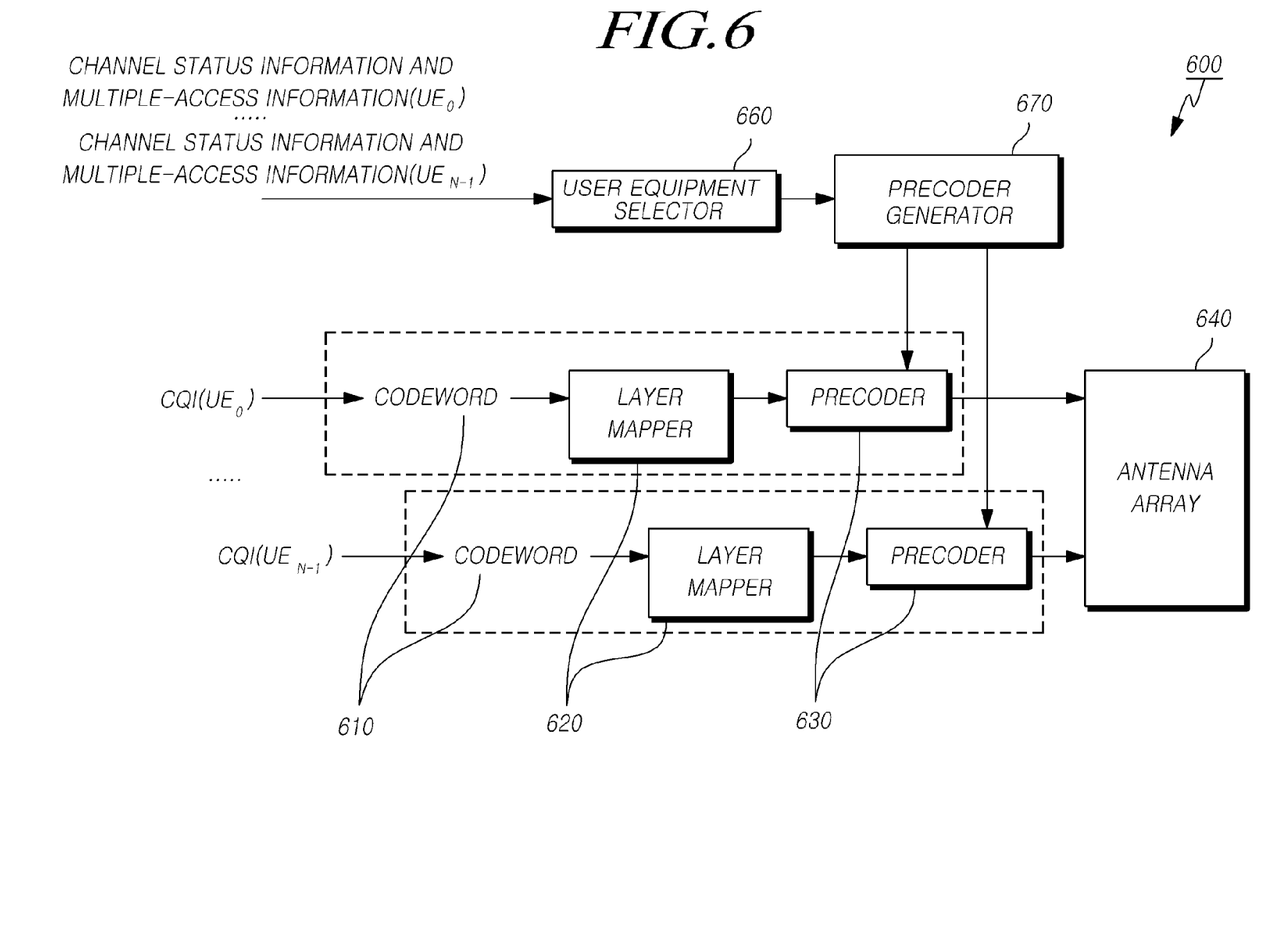
FIG. 6 is a block diagram illustrating a base station (BS) according to another embodiment of the present invention.

FIG. 6 illustrates a BS according to another embodiment of the present invention.

The BS 600 or a BS device may include a layer mapper 620 to perform mapping of a codeword 610 on a layer, a PC 630 to perform precoding of symbols, and an antenna array 640 including two or more antennas that propagate a precoded symbol into air. The layer mapper 620, the PC 630, and the antenna array 640 may be the same or substantially the same as a current or future general configuration and thus, detailed descriptions thereof will be omitted.

Each UE may transfer, to the BS 600, channel information including the channel status information and the multiple-access information, based on the described method. Also, each UE may measure a channel capacity or a channel quality through use of a reference signal, and may report the measured value to the BS 600 through a CQI as another piece of channel status information.

The BS 600 may include a UE selector 660 and a PC generator 670.

The UE selector 660 may determine whether to perform SU-MIMO transmission or MU-MIMO transmission based on the CQIs and the channel information including the channel status information and the multiple-access information, reported from each UE, and may select corresponding UEs. When the SU-MIMO transmission is determined, the UE selector 660 may select a single UE. When the MU-MIMO transmission is determined, the UE selector 660 may compare CQIs and channel information including the channel status information and the multiple-access information reported from each UE, and may recognize correlation between channels of the UEs. The UE selector 660 may select UEs that satisfy a predetermined condition based on the correlation between the channels of the UEs. In this example, the UEs that satisfy the predetermined condition may indicate UEs that have least channel interference between the UEs, but this may not be limited thereto.

For example, in the case of the MIMO scheme that allows simultaneous access of n UEs, the channel information may include n PMIs included in the channel status information reported from n UEs and (n−1)×(n−1) BCIs included in the multiple-access information reported from the n UEs.

In this example, when a precoding matrix designated by a PMI of a UE is identical to one of precoding matrices designated by BCIs of other UEs, the UE selector 660 may determine MU-MIMO transmission of the UE and at least one of the other UEs. For example, when UE U0 transmits a PMI corresponding to a seventh codeword and a BCI corresponding to a fourth codeword in Table 1, and UE U1 transmits a PMI corresponding to the fourth codeword and transmits a BCI corresponding to the seventh codeword in Table 1, the BS may allow simultaneous access of UE U0 and UE U1. In this example, the UE selector 660 may determine precoding matrices designated by BCIs of other UEs based on a codebook for the BCI of Table 2, Table 3, or Table 5 obtained by deleting a few codewords from the codebook of Table 1.

When reported CQIs of the determined UE and the at least one of the other UEs are smaller than a threshold, the UE selector 660 may determine SU-MIMO transmission.

As another example, in the case of the MIMO scheme that allows simultaneous access of n UEs, the channel information may include n PMIs included in the channel status information reported from the n UEs and (n−1)×(n−1) WCIs included in the multiple-access information reported from the n UEs.

When a precoding matrix designated by a PMI of a UE is identical to one of precoding matrices that are not designated by WCIs of other UEs, the UE selector 660 may determine the MU-MIMO transmission of the UE and at least one of the other UEs. In this example, the UE selector 660 may determine precoding matrices that are not designated by the WCIs of the other UEs, for example, precoding matrices deleted from Table 4 or Table 6, based on a codebook for the WCI of Table 4 or Table 6 obtained by deleting a few codewords from the codebook of Table 1.

When reported CQIs of the determined UE and the at least one of the other UEs are smaller than a threshold, the UE selector 660 may determine SU-MIMO transmission.

The PC generator 670 may generate a precoding matrix of one or two or more UEs selected by the UE selector 660. In this example, the PC generator 670 may generate the precoding matrix of one or two or more UEs based on channel information reported from UEs selected by the UE selector 660, for example, PMIs of the selected UEs.

The BS according to another embodiment has been described. Hereinafter, a transmission method of the BS according to another embodiment will be described.

Figure 7:
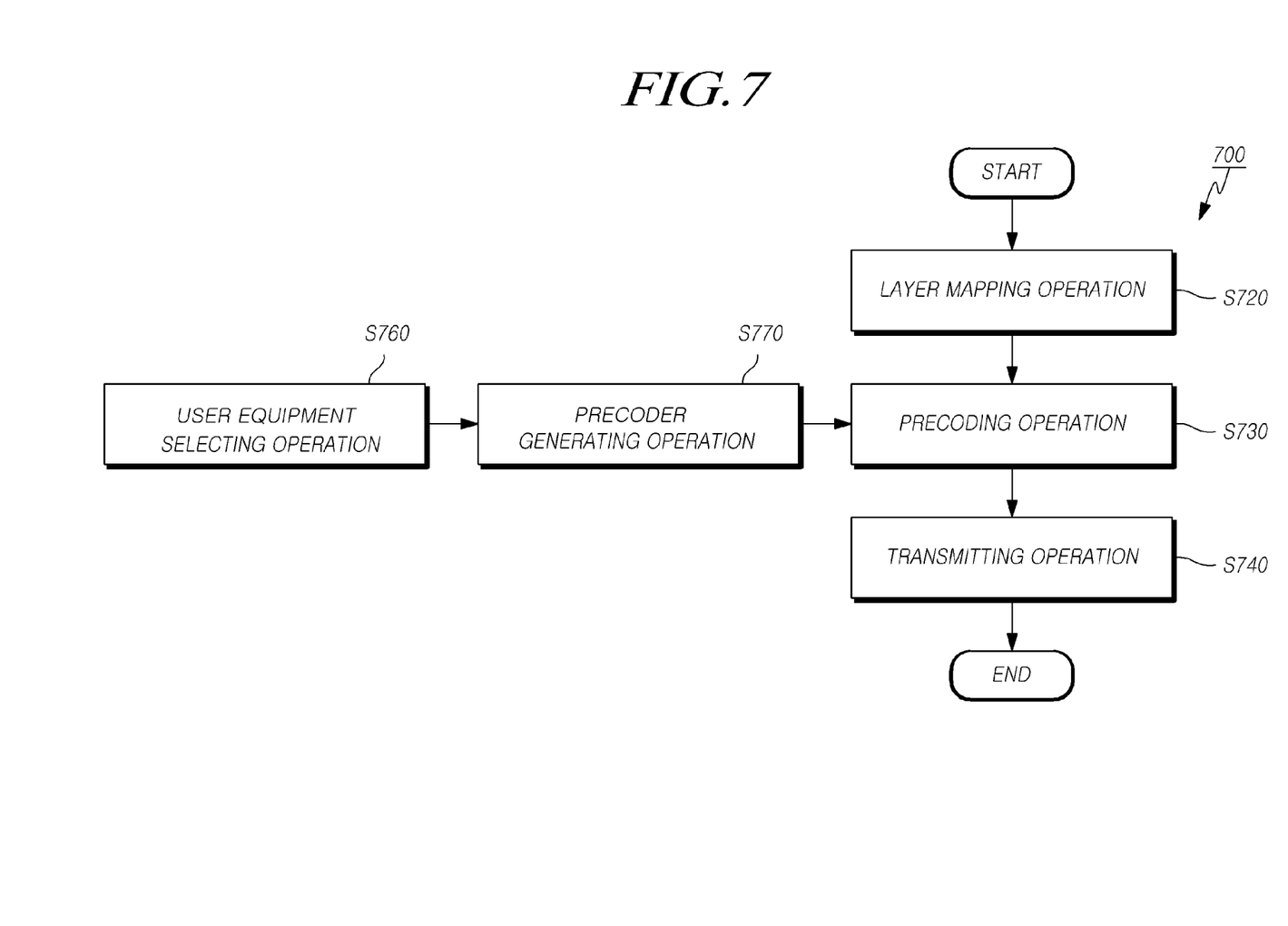
FIG. 7 is a flowchart illustrating a transmission method of a BS according to another embodiment of the present invention.

FIG. 7 illustrates a transmission method of a BS according to another embodiment of the present invention.

Referring to FIG. 7, a transmission method 700 of the BS may include a layer mapping operation (step S720) that performs mapping of a codeword 610 on a layer, a precoding operation (step S730) to perform precoding of symbols, and a transmitting operation (step S740) to propagate a precoded symbol into air through two or more antennas. The layer mapping operation (step S720), the precoding operation (step S730), and the transmitting operation (step S740) may be the same or substantially the same as a current or future general configuration and thus, detailed descriptions thereof will be omitted.

The transmission method 700 of the BS may include a UE selecting operation (step S760) and a PC generating operation (step S770).

The UE selecting operation (step S760) may determine whether to perform SU-MIMO transmission or MU-MIMO transmission based on CQIs and channel information including channel status information and multiple-access information reported from each UE, and may select corresponding UEs. When the SU-MIMO transmission is determined, the UE selecting operation (step S760) may select a single UE. When the MU-MIMO transmission is determined, the UE selecting operation (step S760) may compare the CQIs and the channel information including the channel status information and the multiple-access information reported from each UE, so as to recognize correlation between channels of UEs.

In particular, the UE selecting operation (step S760) may determine precoding matrices designated by BCIs of other UEs, based on a codebook for the BCI of Table 2, Table 3, or Table 5 obtained by deleting a few codewords from the codebook of Table 1. Conversely, the UE selecting operation (step S760) may determine precoding matrices that are not designated by WCIs of other UEs, for example, precoding matrices that are deleted from Table 4 or Table 6, based on a codebook for the WCI of Table 4 or Table 6 obtained by deleting a few codewords from the codebook of Table 1.

When reported CQIs of a determined UE and determined at least one of other UEs are smaller than a threshold, the UE selector 660 may determine SU-MIMO transmission.

The PC generating operation (step S770) may generate a precoding matrix (precoding matrices) of a UE(UEs) selected in the UE selecting operation (step S760). In this example, the PC generating operation (step S770) may generate a precoding matrix (precoding matrices) of the UE(s) based on the channel information reported from the UEs selected in the UE selecting operation (step S760).

Although the embodiments of the present invention have been described with reference to accompanying drawings, the embodiments of the present invention may not be limited thereto.

The embodiments of the present invention may be applicable to a UL/DL MIMO system, and may be applicable to all UL/DL MIMO systems such as a single cell environment, a coordinated multi-point transmission/reception system (CoMP) and heterogeneous network, and the like.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:
1. A channel information transmitting method of a user equipment (UE), the method comprising:
  transmitting first information of m bits associated with a first precoding matrix, m being a natural number greater than 1; and transmitting second information of n bits associated with a second precoding matrix that is associated with interference, n being a natural number greater than 1 and less than m.

2. The method as claimed in claim 1, wherein the first information is an index associated with the first precoding matrix.

3. The method as claimed in claim 1, wherein the second information is an index (best companion indicator) associated with the second precoding that causes the least amount of interference to be received by the UE when a signal is transmitted based on a precoding matrix indicated by the first information, or is an index (worst companion indicator) associated with the second precoding matrix that causes the greatest amount of interference to be received by the UE when a signal is transmitted based on a precoding matrix indicated by the first information.

4. The method as claimed in claim 3, wherein the first information is a first index associated with the first precoding matrix, and the second information is a second index associated with the second precoding matrix that is selected from among indices corresponding to precoding matrices selected from the precoding matrices.

5. The method as claimed in claim 4, wherein the second index is selected from among indices obtained by indexing indices remaining after deleting an index corresponding to at least one precoding matrix that has relatively high similarity to the first precoding matrix designated by the first index.

6. The method as claimed in claim 4, wherein the second index is selected from among indices obtained by indexing indices remaining after deleting an index corresponding to at least one precoding matrix that has relatively low similarity to the first precoding matrix designated by the first index.

7. The method as claimed in claim 5, wherein the similarity corresponds to at least one of a distance between precoding matrices and correlation between the precoding matrices.

8. The method as claimed in claim 5, wherein indices of the first information are indexed based on similarity between precoding matrices, and the second information is a second index associated with the second precoding matrix that is selected from among indices corresponding to a predetermined number of adjacent precoding matrices from among the precoding matrices.

9. The method as claimed in claim 5, wherein indices of the first information are indexed based on similarity between precoding matrices, and the second information is a second index associated with the second precoding matrix that is selected from among indices corresponding to a predetermined number of distant precoding matrices from among the precoding matrices.

10. The method as claimed in claim 6, wherein the similarity corresponds to at least one of a distance between precoding matrices and correlation between the precoding matrices.

11. A channel information feedback method, the method comprising:
receiving a reference signal from a base station (BS);
estimating a channel based on the received reference signal;
generating, based on a result of the channel estimation of a channel estimator, channel information including first information of m bits associated with a first precoding matrix and second information of n bits associated with a second precoding matrix that is associated with interference, m being a natural number greater than 1 and n being a natural number greater than 1 and less than m; and
feeding back the generated channel information.

12. The method as claimed in claim 11, wherein the second information is an index (best companion indicator) associated with the second precoding matrix that causes the least amount of interference to be received by a user equipment (UE) when a signal is transmitted based on a precoding matrix indicated by the first information, or an index (worst companion indicator) associated with the second precoding matrix that causes the greatest amount of interference to be received by the UE when a signal is transmitted based on a precoding matrix indicated by the first information.

13. The method as claimed in claim 12, wherein the first information is an index associated with the first precoding matrix.

14. The method as claimed in claim 11, wherein the first information is a first index associated with the first precoding matrix, and the second information is a second index associated with the second precoding matrix that is selected from among indices corresponding to precoding matrices selected from among the precoding matrices.

15. The method as claimed in claim 14, wherein the second index is selected from among indices obtained by indexing indices remaining after deleting an index corresponding to at least one precoding matrix that has relatively high similarity to the first precoding matrix designated by the first index.

16. The method as claimed in claim 14, wherein the second index is selected from among indices obtained by indexing indices remaining after deleting an index corresponding to at least one precoding matrix that has relatively low similarity to the first precoding matrix designated by the first index.

17. The method as claimed in claim 15, wherein the similarity corresponds to both or one of a distance between precoding matrices and correlation between the precoding matrices.

18. The method as claimed in claim 15, wherein indices of the first information are indexed based on similarity between precoding matrices, and the second information is a second index associated with the second precoding matrix that is selected from among indices corresponding to a predetermined number of adjacent precoding matrices from among the precoding matrices.

19. The method as claimed in claim 15, wherein indices of the first information are indexed based on similarity between precoding matrices, and the second information is a second index associated with the second precoding matrix that is selected from among indices corresponding to a predetermined number of distant precoding matrices from among the precoding matrices.

20. The method as claimed in claim 16, wherein the similarity corresponds to both or one of a distance between precoding matrices and correlation between the precoding matrices.

21. A channel information feedback apparatus, the apparatus comprising:
a reference signal receiver to receive a reference signal from a base station (BS);
a channel estimator to estimate a channel based on the received reference signal;

a channel information generator to generate, based on a result of the channel estimation of the channel estimator, channel information including first information of m bits associated with a first precoding matrix and second information of n bits associated with a second precoding matrix that is associated with interference, m being a natural number greater than 1 and n being a natural number greater than 1 and less than m; and a feedback section to feedback the generated channel information.

22. The apparatus as claimed in claim 21, wherein the first information is an index associated with the first precoding matrix.

23. The apparatus as claimed in claim 21, wherein the second information is an index (best companion indicator) associated with the second precoding matrix that causes the least amount of interference to be received by a user equipment (UE) when a signal is transmitted based on a precoding matrix indicated by the first information, or an index (worst companion indicator) associated with the second precoding matrix that causes the greatest amount of interference to be received by the UE when a signal is transmitted based on a precoding matrix indicated by the first information.

24. The apparatus as claimed in claimed 21, wherein the first information is a first index associated with the first precoding matrix, and the second information is a second index associated with the second precoding matrix that is selected from among indices corresponding to precoding matrices selected from among precoding matrices.

25. The apparatus as claimed in claim 24, wherein the second index is selected from among indices obtained by indexing indices remaining after deleting an index corresponding to at least one precoding matrix that has relatively high similarity to the first precoding matrix designated by the first index.

26. The apparatus as claimed in claim 24, wherein the second index is selected from among indices obtained by indexing indices remaining after deleting an index corresponding to at least one precoding matrix that has relatively low similarity to the first precoding matrix designated by the first index.

27. The apparatus as claimed in claim 25, wherein the similarity corresponds to both or one of a distance between precoding matrices and correlation between the precoding matrices.

28. The apparatus as claimed in claim 25, wherein indices of the first information are indexed based on similarity between precoding matrices, and the second information is a second index associated with the second precoding matrix that is selected from among indices corresponding to a predetermined number of adjacent precoding matrices from among the precoding matrices.

29. The apparatus as claimed in claim 25, wherein indices of the first information are indexed based on similarity between precoding matrices, and the second information is a second index associated with the second precoding matrix that is selected from among indices corresponding to a predetermined number of distant precoding matrices from among the precoding matrices.

30. The apparatus as claimed in claim 26, wherein the similarity corresponds to both or one of a distance between precoding matrices and correlation between the precoding matrices.

31. A base station (BS), comprising:
a layer mapper to perform mapping of a codeword on a layer;
a precoder to perform precoding of mapped symbols through use of a precoding matrix;
an antenna array including two or more antennas that propagate a precoded symbol into air; and
a precoder generator to generate a precoding matrix of user equipments (UEs) based on channel information including first information of m bits associated with a first precoding matrix of each UE and second information of n bits associated with a second precoding matrix that is associated with interference, m being a natural number greater than 1 and n being a natural number greater than 1 and less than m.

32. A transmitting method, the method comprising:
mapping a codeword on a layer;
precoding mapped symbols based on a precoding matrix;
transmitting a precoded symbol into air through an antenna array including two or more antennas; and
generating a precoding matrix of UEs based on the channel information including first information of m bits associated with a first precoding matrix of each UE and second information of n bits associated with a second precoding matrix that is associated with interference, m being a natural number greater than 1 and n being a natural number greater than 1 and less than m.

33. A channel information transmitting method of a user equipment (UE), the method comprising:
transmitting a first index of m bits associated with a first precoding matrix selected from among precoding matrices, m being a natural number greater than 1; and
transmitting a second index of n bits associated with a second precoding matrix that is associated with interference, n being a natural number greater than 1 and less than m,
wherein the second index in the second index transmitting operation is selected from among indices obtained by indexing indices remaining after deleting an index corresponding to at least one precoding matrix that has relatively high similarity to the first precoding matrix designated by the first index, or is selected from among indices obtained by indexing indices remaining after deleting an index corresponding to at least one precoding matrix that has relatively low similarity to the first precoding matrix designated by the first index.

34. A channel information receiving method of a base station (BS), the method comprising:
receiving a first index of m bits associated with a first precoding matrix that is selected from among precoding matrices; and
receiving a second index of n bits associated with a second precoding matrix that is associated with interference,
wherein the second index in the second index receiving operation is selected from among indices obtained by indexing indices remaining after deleting an index corresponding to at least one precoding matrix that has relatively high similarity to the first precoding matrix designated by the first index, or is selected from among indices obtained by indexing indices remaining after deleting an index corresponding to at least one precoding matrix that has relatively low similarity to the first precoding matrix designated by the first index.

* * * * *